No. 799,425. PATENTED SEPT. 12, 1905.
W. H. WILDER.
BUNCHING DEVICE FOR BEAN HARVESTERS.
APPLICATION FILED OCT. 26, 1904.

2 SHEETS—SHEET 1.

Witnesses
E. F. Stewart
Wm. Bagger

William H. Wilder,
Inventor,
by C. A. Snow & Co,
Attorneys

No. 799,425. PATENTED SEPT. 12, 1905.
W. H. WILDER.
BUNCHING DEVICE FOR BEAN HARVESTERS.
APPLICATION FILED OCT. 26, 1904.

2 SHEETS—SHEET 2.

Witnesses

William H. Wilder,
Inventor.

by C. A. Snow & Co.
Attorneys

UNITED STATES PATENT OFFICE.

WILLIAM HENRY WILDER, OF CALEDONIA, NEW YORK.

BUNCHING DEVICE FOR BEAN-HARVESTERS.

No. 799,425.     Specification of Letters Patent.     Patented Sept. 12, 1905.

Application filed October 26, 1904. Serial No. 230,101.

*To all whom it may concern:*

Be it known that I, WILLIAM HENRY WILDER, a citizen of the United States, residing at Caledonia, in the county of Livingston and State of New York, have invented a new and useful Bunching Device for Bean-Harvesters, of which the following is a specification.

This invention relates to that class of harvesters which are used particularly for the purpose of harvesting such crops as beans, peas, and the like, the vines of which are usually matted in such a manner that they may not be successfully gathered or harvested by harvesting-machines of ordinary construction; and the invention relates particularly to what is known as "bunching devices" for harvesters of this class, which are commonly known as "bean-harvesters."

Such bunching attachment usually consists of a device in the form of a rake following in rear of the cutting apparatus of the harvester and serving to gather the vines and to deposit the same in bunches; and the present invention has particular reference to the bunching device and to the means for operating the same.

The object of the invention is to simplify and improve the construction of a bunching device; and with these ends in view the invention consists in the improved construction and novel arrangement and combination of parts which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

Figure 1:
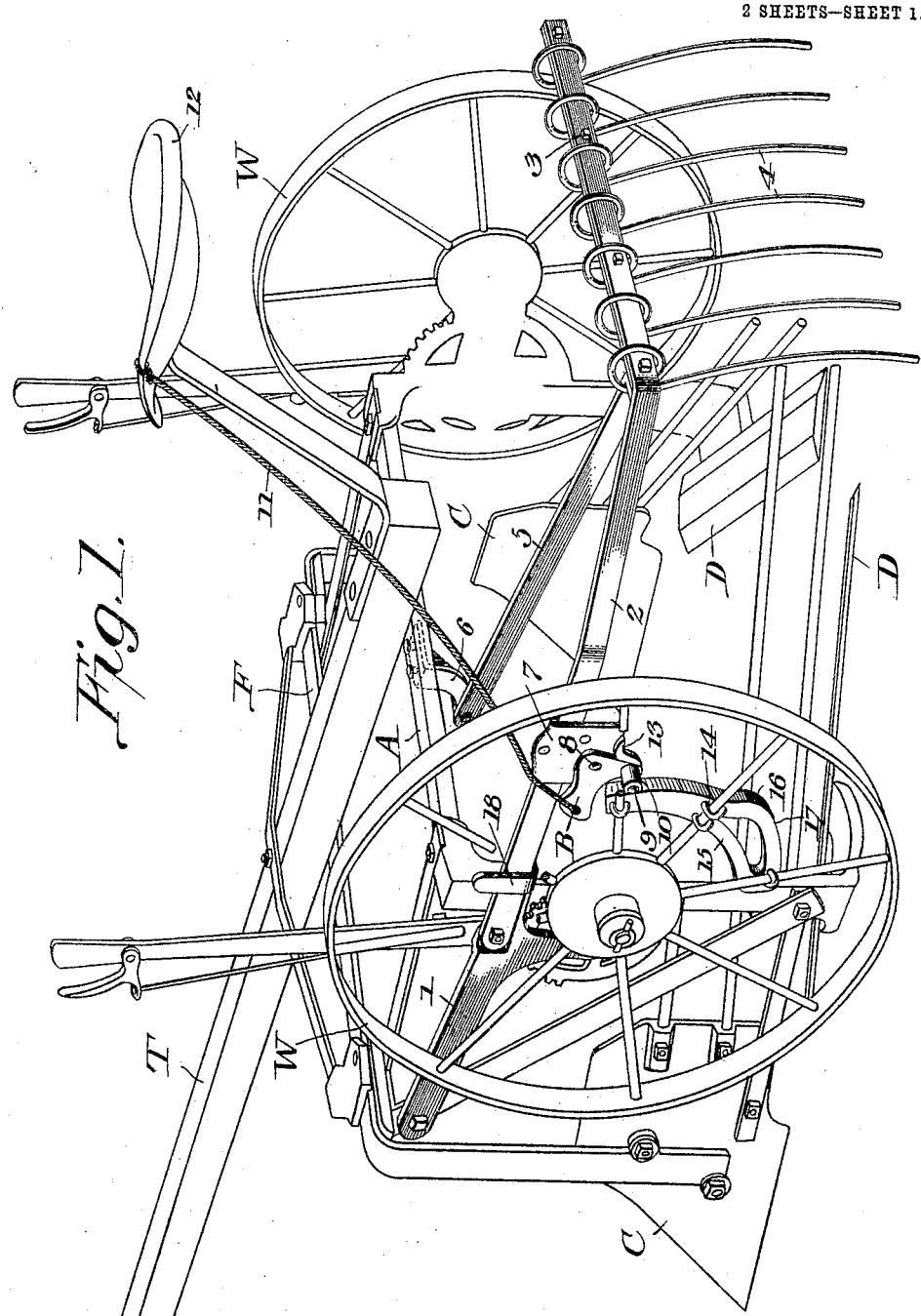
Figure 2:
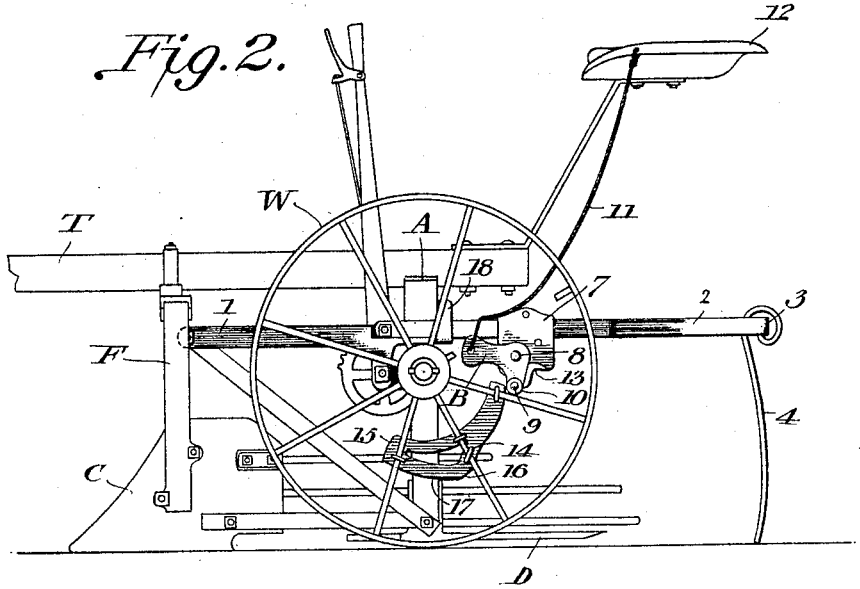
Figure 3:
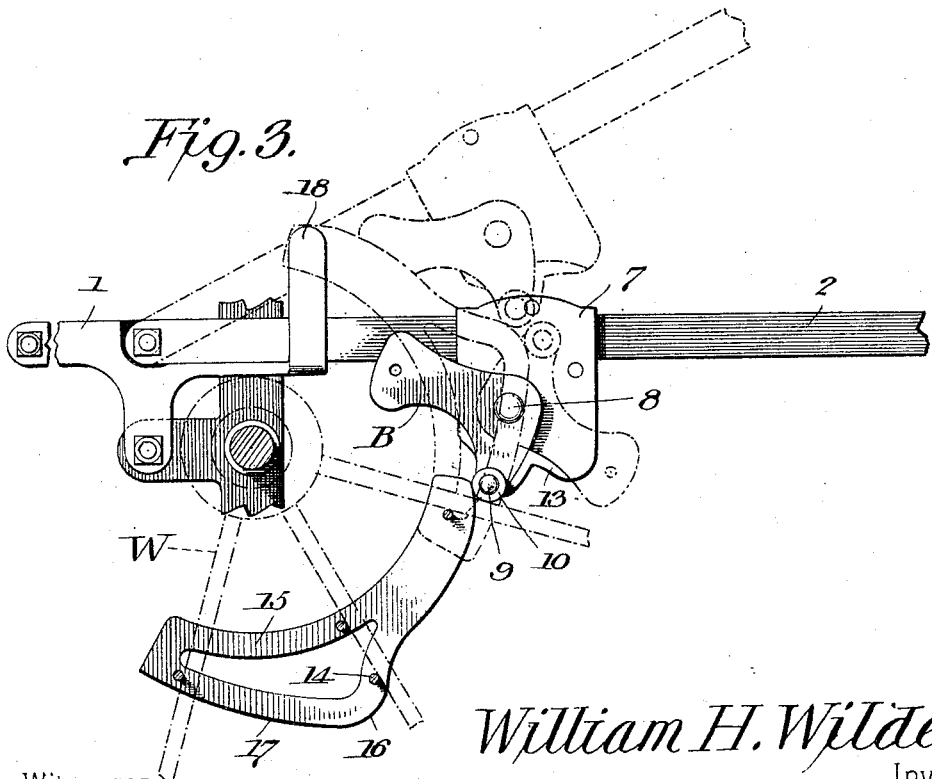

In said drawings, Figure 1 is a perspective view showing a form of bean-harvester equipped with the invention. Fig. 2 is a side elevation. Fig. 3 is a detail side elevation, on a larger scale, with different positions of the buncher-arm and its operating mechanism indicated in dotted lines.

Corresponding parts in the several figures are indicated by like characters of reference.

The invention has in the accompanying drawings been illustrated as applied to a bean-harvester of ordinary and well-known construction, F indicating the frame, W the wheels, C and D the cutters, T the tongue, and A the arched axle.

1 designates a bracket member, which is bolted or otherwise suitably secured to the frame, and to this bracket is pivotally connected a rearwardly-extending arm 2, the rear end of which is bent transversely to form a head 3, with which a suitable number of spring-teeth 4 are suitably connected in such a manner as to constitute a rake. The rear end of the arm 2 has secured thereto a brace 5, the forward edge of which is pivotally connected with a bracket 6, depending from the arched axle.

Firmly secured to the outer side of the arm 2 is a plate or casting 7, upon which at 8 is fulcrumed a bell-crank B, one arm of which carries a pin or lug 9, upon which may be journaled a roller 10, the other arm of said bell-crank being connected by a rope or flexible element 11 with a suitable fixed point, such as the driver's seat 12, where it may be conveniently reached and manipulated by the driver. The plate 7 is provided near its lower edge with a stop-flange 13, adapted to engage and support either one of the arms of the bell-crank lever B, the various positions being indicated in full and in broken lines in Fig. 3 of the drawings.

It will be observed that the rake-carrying arm 2, having the plate 7 and the box connected therewith, is disposed closely adjacent to the inner side of one of the transporting-wheels of the machine. Suitably secured to the inner side of said transporting-wheel—as, for instance, by clips or similar attaching devices 14—is a cam 15, having a shouldered or humped portion 16, said cam and the hump thereof being disposed in the path of the roller 10 upon the ball-crank lever B when the roller-carrying arm of the latter rests upon the supporting-flange 13 in the position shown in Figs. 1 and 2 and in full lines in Fig. 3. When the parts are in this related position and the machine travels in a forward direction, the cam 15 on engaging the roller 10 will gradually tilt or lift the rake-carrying arm in an upward direction to the position shown in dotted lines in Fig. 3, when the humped portion of the cam having passed by the roller 10 the latter will gradually ride down the inclined terminal end 17 of the cam, thus restoring the rake-carrying arm to its normal operative position, in which it is supported by means of a stop-finger 18, extending laterally upon the bracket 1.

Under ordinary circumstances—that is, when the roller-carrying bell-crank is in the position shown in Figs. 1 and 2 and in full lines in Fig. 3—the rake or bunching mechanism will be tripped once during each revolution of the wheel of the machine. Sometimes, however, when the crop is below the average and the vines are thin it may be desired to permit the machine to travel a greater distance without tripping. When this is the case, the rope or flexible element 11 is operated to swing the bell-crank B upon its pivot until the upper arm of said bell-crank is supported upon the flange 13, when the roller 10 will be supported out of the path of the cam 15, as will be clearly seen by reference to Fig. 3 of the drawings. It is obvious that when the bell-crank is in this position the cam-carrying wheel may revolve without affecting the position of the rake-carrying arm. To cause the latter to be tilted or actuated, it is only necessary to restore the bell-crank B to operative position, which may be readily done by means of the cord 11.

From the foregoing description, taken in connection with the accompanying drawings, the operation and advantages of this invention will be readily understood.

The construction of the improved bunching attachment is extremely simple. It is light, and but little power is consequently required to trip it. It is practically carried by the single arm 2, connected pivotally with the bracket member 1, and friction in operating the device is therefore reduced to a minimum. The bracket member 1 supports the bunching device securely in operative position by the stop-finger 18, which is formed upon said bracket member. The construction of the trip mechanism and the cam whereby said trip mechanism is operated is extremely simple and capable of being conveniently manipulated to throw said trip mechanism into or out of gear, as may be required.

Having thus described the invention, what is claimed is—

1. In a device of the class described, a rake-carrying arm, pivotally mounted, a cam-bearing wheel adjacent to said arm, a flanged plate connected with the arm, and a bell-crank pivoted to said plate and having a cam-engaging member.

2. In a device of the class described, a pivoted rake-carrying arm, supporting means for the same, a cam-bearing wheel adjacent to said arm, a plate connected with the latter and having a supporting-flange, a bell-crank pivoted to said plate, a cam-engaging member upon one arm of the bell-crank and adapted to be supported in the path of and to be engaged by the cam, and means for tilting the bell-crank upon its fulcrum.

In testimony that I claim the foregoing as my own I have hereto affixed my signature in the presence of two witnesses.

WILLIAM HENRY WILDER.

Witnesses:
   EDWARD B. MCKAY,
   ALLAN B. MCKAY.